Sept. 19, 1939.   E. D. DALL   2,173,357
CONTROL MECHANISM FOR BRAKE LEVERS AND THE LIKE
Filed June 8, 1937   2 Sheets-Sheet 2

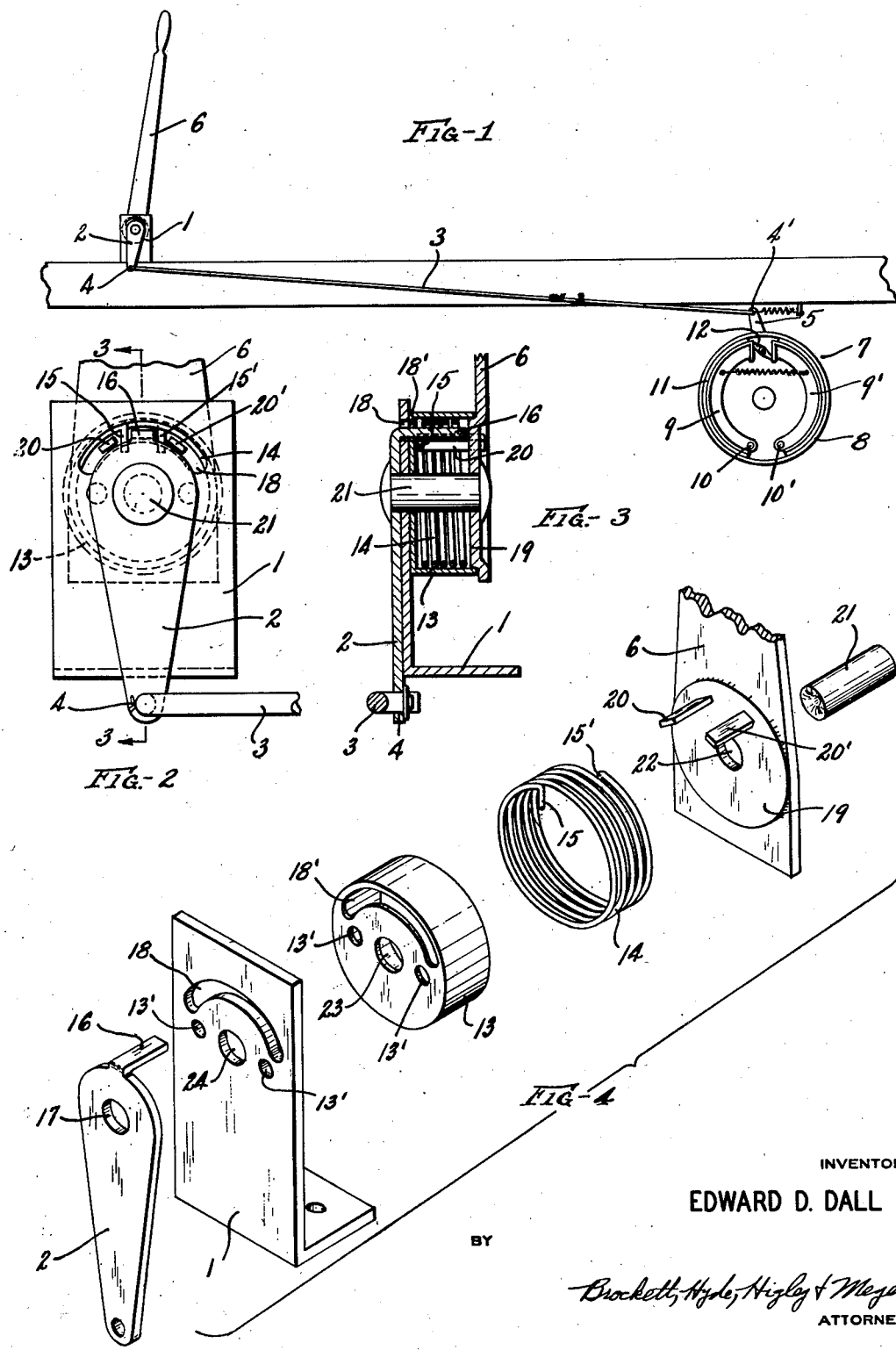

INVENTOR
EDWARD D. DALL
BY
Brockett, Hyde, Higley & Meyer
ATTORNEYS

Patented Sept. 19, 1939

2,173,357

UNITED STATES PATENT OFFICE 2,173,357

CONTROL MECHANISM FOR BRAKE LEVERS AND THE LIKE

Edward D. Dall, Waukegan, Ill., assignor, by direct and mesne assignments, to Houdaille-Hershey Corporation, Detroit, Mich., a corporation of Michigan Application June 8, 1937, Serial No. 147,154

1 Claim. (Cl. 74—531)

My invention relates to improvements in brake levers and the like in which a friction device is used to hold the lever in adjusted position instead of the usual ratchet and pawl arrangement, and the object of my improvement is to provide novel means whereby a lever is locked in adjusted position and released therefrom without the necessity of releasing a pawl.

This invention is more particularly designed for automobiles but can be used in any machine wherein a lever is used for holding or releasing brakes or for holding other objects in a certain position so that they can not be moved except by the handle of the lever.

I attain this object by mechanism illustrated in the accompanying drawings in which—

Fig. 1 is a side elevation of a brake lever control mechanism using my invention;

Fig. 2 is an enlarged side view of a portion of the mechanism of Fig. 1;

Fig. 3 is a sectional view taken on the line 3—3 of Fig. 2;

Fig. 4 is a detailed view of the parts of Fig. 3 disassembled.

Figure 5:
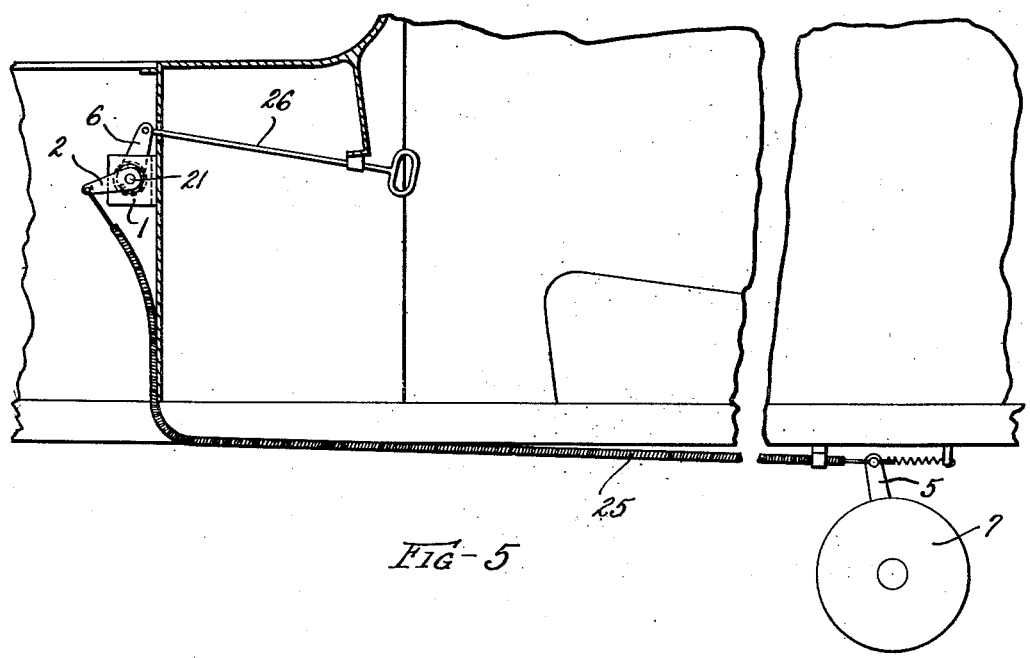
Fig. 5 is a partial side elevation of an automobile showing a modification of my brake lever control mechanism.

I will describe my control mechanism as applied to an automobile or other vehicle brake.

In Figs. 1 to 4, the bracket 1 is rigidly fastened to the frame of an automobile or other vehicle and the lever 2 is journalled in the bracket. A rod 3 is connected to the lever at 4 and to a brake cam lever 5 at 4'. The brake 7 is of the usual type including a drum 8 fastened to a wheel (not shown) and two circular shaped bands 9 and 9' pivoted at 10 and 10' respectively. Linings 11 are fastened to the bands. A cam 12 is fastened to the lever 5 and works between the ends of the bands 9 and 9'. It can readily be seen that operating the lever 5 and cam 12 in counter-clockwise rotation will move the bands 9 and 9' outwardly and compress the lining 11 against the inner wall of the drum 8 of the wheel and therefore brake the wheel. This brake and springs (diagrammatically illustrated) for releasing the same are of the well known standard type and therefore I have not included all of the mechanism in the drawings.

Referring to Figs. 2, 3 and 4, a cylindrical housing or casing 13 is rigidly fastened to the bracket 1 in any suitable manner, as by rivets through openings 13'. A helical spring 14 is coiled in the housing 13 and has two inwardly bent ends 15 and 15' for the purpose hereinafter explained. The lever 2 has an ear or lug 16 and a bearing hole 17. The ear 16 passes through slot 18 of the bracket 1 and slot 18' of the housing 13 and between the bent ends 15 and 15' of the coil spring 14 as shown in Figs. 2 and 3.

A handle 6 has an embossed portion 19 and two ears or lugs 20 and 20'. The ears 20 and 20' lie on the outside of or to the left and right respectively (Fig. 2) of the bent ends of the coil spring. The embossed part 19 of the handle fits in the housing 13 as shown in Fig. 3 and provides a bearing for the handle. The handle 6 and lever 2 are held together by shaft 21 which extends through the holes 22 of the handle 6, 23 of the housing 13, 24 of the bracket 1, and 17 of the lever 2. The shaft 21 is then riveted at both ends as shown in Fig. 2. Handle 6 and lever 2 are free to rotate on the shaft 21.

If the handle 6 is moved to the right or clockwise in Fig. 2 the lug 20 will contact the bent end 15 of the spring 14 and coil the spring 14 drawing it away from the inner wall of the casing 13 and the same end 15 of the spring 14 will contact the left side of the lug 16 of the lever 2 and carry the lever along with the spring and handle in a clockwise rotation. Consequently the lever 2 will pull on the rod 3 and operate the lever 5 and cam 12 to brake the drum 8 of the wheel. After the brake is set and handle 6 released, the pull on the rod 3 by the usual brake springs to release the brake tends to turn the lever 2 in counterclockwise direction, but the left side of the lug 16 is forced against the bent end 15 of the spring 14 and tends to uncoil and expand the spring against the inner wall of the casing and thereby locks the lever 2 against movement by the rod 3 and the usual brake release springs.

To release the brake, the handle 6 is moved to the left or counterclockwise in Fig. 2. Such action causes lug 20' to engage the bent end 15' of the spring 14. This contracts the spring 14 away from the inner wall of the casing 13 and as 15' engages 16 causes movement of the lever 2 counterclockwise.

The lever 2 may be arranged at various angles in relation to the handle 6. For instance, in Fig. 2 the lugs 16, 20 and 20' and slots 18 and 18' may be placed in different radial positions to place the lever 2 at any desired angle in relation to the handle 6.

The bracket 1 may be placed on the dash under the hood in a suitable position, as shown in Fig. 5. The lever 2 is placed at about a 90° angle to the handle 6, a wire 25 leads from lever 2 under the body to the lever 5 of brake 7 and the handle 6 is shortened. A rod 26 is connected to the handle 6 and leads inside of the body in such manner that the rod can be pushed and pulled to operate the handle 6 and lever 2. It can readily be seen that a push and pull on the rod 26 will operate the handle means and lever and, through the connection, operate the brake.

Figures 6, 7, 8:
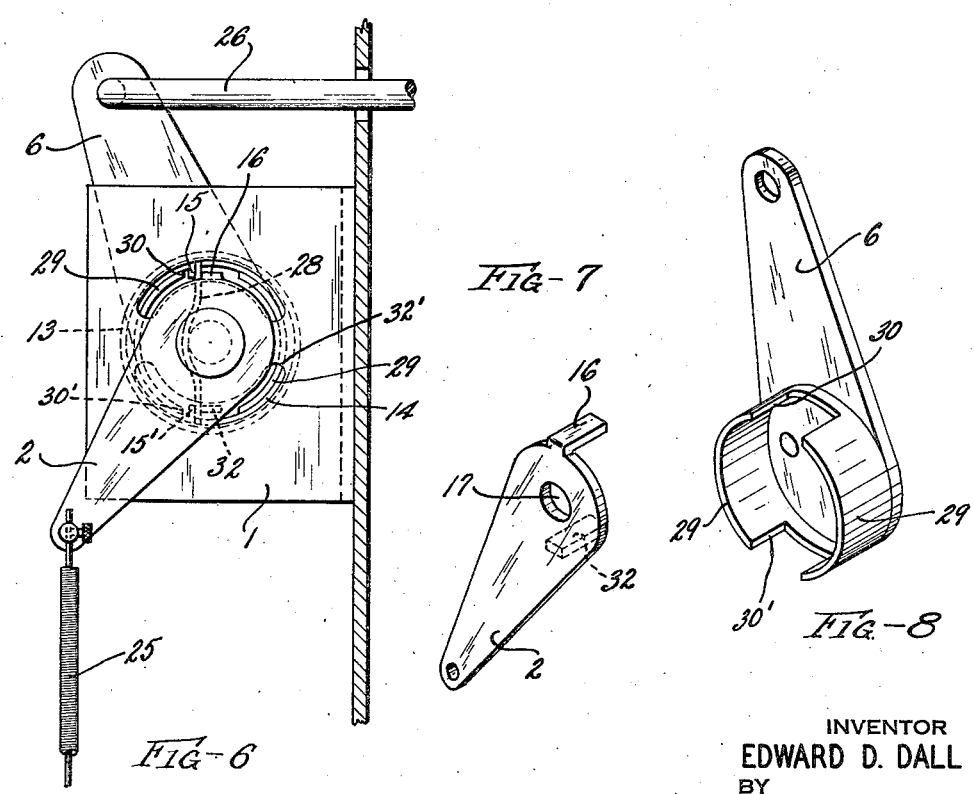
Fig. 6 is an enlarged elevation of the control mechanism of Fig. 5.
Figs. 7 and 8 are perspective views of parts of Fig. 6.

In Figs. 6, 7 and 8 the construction is like that in Figs. 2 to 4 with a few exceptions. The spring 14 has its bent ends 15 and 15' in different relative positions and a bridge member or yoke, such as a piece of flat steel 28 has its opposite ends contacting the bent ends 15 and 15' of the spring 14. The lug 16 of the lever 2 rests against one end of the flat piece 28, adjacent end 15 of the spring, and any pressure applied to the lever 2 tending to produce counterclockwise movement thereof will cause lug 16 to apply pressure to the flat piece 28 and both ends 15 and 15' of the spring 14 in a direction to expand the spring 14 by both ends and force the spring against the inner wall of the housing 13 with a greater pressure than the structure of Figs. 2 to 4. Another lug 32 is fastened to the lever 2 and contacts the other end of the flat piece 28 adjacent the end 15' of the spring, if lever 2 is attempted to be moved clockwise. This action expands spring 14 from both ends to lock the lever 2 against movement. Lug 32 makes necessary another slot 32' performing a function like 18' in the housing 13 and 18 in the bracket 1.

The means by which lever 6 contracts spring 14 is shown in Figs. 6, 7 and 8. Instead of the handle means 6 having an embossed portion 19, a housing 29 is rigidly fastened to the handle and fits inside of the spring 14 and has two cut away sections or notches leaving edges 30 and 30'. The edge 30 contracts the spring 14 at the end 15 in place of and in the same way as the lug 20 when lever 6 is moved clockwise, and edge 30' contracts the spring end 15' the same as lug 20' heretofore described when lever 6 is moved counterclockwise.

Another purpose of the housing 29 is to prevent the spring 14 from pulling away from the wall of the housing 13 any farther than necessary to release the spring 14 and to move the lever 2 as heretofore described. This prevents any material back movement of the lever 2 when the handle and lever are pulled to tighten the brake. For instance, when the handle 6 is pulled to the right as shown in Fig. 2 the lug 20 may contract the spring 14 by its end 15 away from the inner wall of the housing 13 farther than necessary to release the spring and this distance must be taken up by back movement of the lever 2 before the spring 14 will be expanded against the wall of housing 13 to lock the lever 2. This backward movement of lever 2 before it is locked is objectionable. With the housing 29 in place the spring 14 cannot move away from the wall this unnecessary distance and therefore there will be only a very slight backward movement of lever 2, if any.

The same effect may be obtained in Figs. 2 and 4 by forming an annular ring extending from the left side of lug 20 around to the right side of lug 20', or by forming additional lugs on handle 6 on the same circle with lugs 20 and 20'.

What I claim is:

An automotive vehicle emergency brake lever construction including a lever in operative connection with the brake mechanism of the vehicle, a handle coaxially pivoted with respect to said lever and oscillatable about its pivot to set and release the brakes, a drum having a flange concentric with said pivot, a helical spring arranged with its convolutions in frictional engagement with the inner surface of said flange and having its ends inturned toward the pivot, a housing fastened to said handle and having a peripheral portion within the drum disposed to engage the spring ends to contract the spring and cause movement of the spring with respect to the flange, a yoke within said drum arranged with its ends against the spring ends, said lever having a part within the drum disposed to engage an end of the yoke to expand the spring into tight frictional engagement with the flange, said housing being arranged for edgewise abutment of its peripheral portion against a spring end so that swing of the handle in brake setting direction will contact the spring and swing the lever with it, said housing being so arranged with respect to the drum surface as to form a guideway for the spring convolutions and prevent displacement of any part of a convolution from the cylindrical surface defined by the convolutions.

EDWARD D. DALL.